US006470094B1

(12) United States Patent
Lienhart et al.

(10) Patent No.: US 6,470,094 B1
(45) Date of Patent: *Oct. 22, 2002

(54) GENERALIZED TEXT LOCALIZATION IN IMAGES

(75) Inventors: Rainer Wolfgang Lienhart, Santa Clara, CA (US); Axel Wernicke, Leipzig (DE)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/524,797

(22) Filed: Mar. 14, 2000

(51) Int. Cl.[7] ................................................. G06K 9/00
(52) U.S. Cl. ..................... 382/176; 382/174; 382/171; 382/270; 382/273
(58) Field of Search ............................... 382/171, 172, 382/173, 174, 176, 164, 168, 270, 273

(56) References Cited

U.S. PATENT DOCUMENTS 5,889,884 A * 3/1999 Hashimoto et al. ......... 382/168
5,889,885 A * 3/1999 Moed et al. ................ 382/171
6,101,274 A * 8/2000 Pizano et al. ............... 382/176

OTHER PUBLICATIONS

E. Chan, et al., Experimentos on Block–Matching Techniques for Video Coding. *Multimedia Systems,* vol. 2, No. 5, pp. 228–241, Dec. 1994.
J.D. Foley, et al., Computer Graphics: Principles and Practice. Addison–Wesley, Reading, MA, USA, 1990, pp. 979–986.

L. Itti, et al., A Model of Saliency–Based Visual Attention for Rapid Scene Analysis. *IEEE Transactions on Pattern Analysis and Machine Intelligence* (PAMI) 1998; 20(11): 1254–1259.
R. Lienhart. Automatic Text Recognition for Video Indexing. Proc. ACM Multimedia 96, Boston, MA, Nov. 1996, pp. 11–20.
R. Lienhart, et al., Automatic Text Segmentation and Text Recognition for Video Indexing. Technical Report TR–98–009, Praktische Informatik IV, University of Mannheim, May 1998.
H. Li, et al., Automatic Text Detection and Tracking in Digital Video. IEEE Trans. on Image Processing., vol. 9, No. 1, Jan. 2000, pp. 147–156.
H. Li, et al., Text Enhancement in Degital Videos. In Proceedings of SPIE99, Document Recognition and Retriecal VI, Jan. 27–28, 1999, San Jose, CA, pp. 2–9.

(List continued on next page.)

Primary Examiner—Phuoc Tran
(74) Attorney, Agent, or Firm—Alan K. Aldous

(57) ABSTRACT

In some embodiments, the invention includes a method for locating text in digital images. The method includes scaling a digital image into images of multiple resolutions and classifying whether pixels in the multiple resolutions are part of a text region. The method also includes integrating scales to create a scale integration saliency map and using the saliency map to create initial text bounding boxes through expanding the boxes from rectangles of pixels including at least one pixel to include groups of at least one pixel adjacent to the rectangles, wherein the groups have a particular relationship to a first threshold. The initial text bounding boxes are consolidated. In other embodiments, a method includes classifying whether pixels are part of a text region, creating initial text bounding boxes, and consolidating the initial text bounding boxes, wherein the consolidating includes creating horizontal projection profiles having adaptive thresholds and vertical projection profiles having adaptive thresholds.

32 Claims, 6 Drawing Sheets

OTHER PUBLICATIONS

H. Li, et al., Text Enhancement In Digital Videos Using Multiple Frame Integration. In ACM Multimedia 1999, Orlando, Fl., 1999, pp. 1–12.

S. Mori, et al., Historical Review of OCR Research and Development. Proceedings of the IEEE, vol. 80, No. 7, pp. 1029–1058, Jul. 1992.

J. Ohya, et al., Recognizing Characters in Scene Images. IEEE Transactions on Pattern Analysis and Machine Intelligence, vol. 16, No. 2, pp. 214–220, 1994.

H. Rowley, et al., Neural Network–Based Face Detection. IEEE Transactions on Pattern Analysis and Machine Intelligence, vol. 20, No. 1, pp. 23–38, Jan. 1998.

Sato, T. et al., Video OCR: Indexing Digital News Libraries by Recognition of Superimposed Caption. ACM Multimedia Sys. Special Issue on Video Libraries, 7(5): 385–395, 1999, p. 1–10.

Sato, T., et al., Video OCR for Digital News Archives. IEEE International Workshop on Content–Based Access of Image and Video Database (CAVID '98), pp. 52–60, 1997.

M. Smith, et al., Video Skimming and Characterization through . . . Image and Language Understanding Techniques. Carnegie Mellon University, Tech Report CMU–CS–97–111, 2/97.

K. Sung. Example–based Learning for View–based Human Face Detection. MIT AI Lab, 12/94, A.I. Memo No. 1521, C.B.C.L. Paper No. 112, Dec. 1994, coversheet and pp. 1–20.

M.J. Swain et al. Color Indexing. *International Journal of Computer Vision*, vol. 7, No. 1, pp. 11–32, 1991.

V. Wu, et al., Finding Text in Images. In Proceedings of Second ACM International Conference on Digital Libraries, Philadelphia, PA, pp. 3–12, 1997.

X. Wu. YIQ Vector Quantization in a New Color Palette Architecture. IEEE Trans. on Image Processing, vol. 5, No. 2, pp. 321–329, Feb. 1996.

B. Yeo et al., Visual Content Highlighting via Automatic Extraction of . . . In Digital Video Compression: Algorithms and Technologies, Proc. SPIE 2668–07 (1996), pp. 38–47.

Y. Zhong, et al., Locating Text in Complex Color Images. Pattern Recognition, vol. 28, No. 10, pp. 1523–1535, Oct. 1995.

Etemad, K., et al., 'Page Segmentation Using Decision Integration and Wavelet Packets,' Proceedings of the IAPR Int'l Conference on Pattern Recognition, Jerussalem, Oct. 9–13, 1994, Confernece B: Pattern Recognition and Neural networks, IEEE Comp. Soc. Press, US, vol. 2 Conf. 12, Oct. 9, 1994, pp. 345–349.

Jain, A.K., 'Fundamentals of Digital Image Processing,' 1989, Prentice Hall, Englewood Cliffs, Chapter 9, especially p. 412, lines 1–24.

Sato, T., et al, 'Video OCR for Digital News Archive,' Proceedings, 1998 IEEE International Workshop on Content–Based Access of Image and Video Database, Bombay, India, Jan. 3, 1998, pp. 52–60.

Cinque, L., et al, 'A Multiresolution Approach for Page Segmentation,' Pattern Recognition Letters, North–Holland Publishing, Amsterdam, NL, vol. 19, No. 2, Feb. 1, 1998, pp. 217–225.

Mukherjee, D.P., et al., 'Document Page Segmentation Using Multiscale Clustering,' Proceedings 1999 International Conference on Image Processing, ICIP 1999, Kobe, Japan, Oct. 24–28, 1999, International Conference on Image Processing, Loas Alamitos, CA:IEEE, US, col. 1 of 4, Oct. 24, 1999, pp. 234–238.

International Search Report, WO 01/69529 A3, published Feb. 7, 2002.

* cited by examiner

DEC 25 1998
2:01:35 PM
FIG. 5
DEC 25 1998
2:01:35 PM
FIG. 6
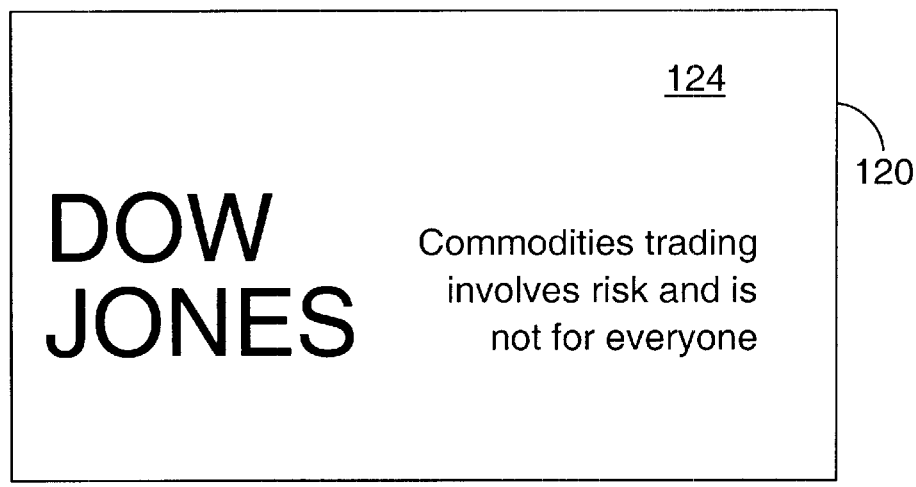
FIG. 7
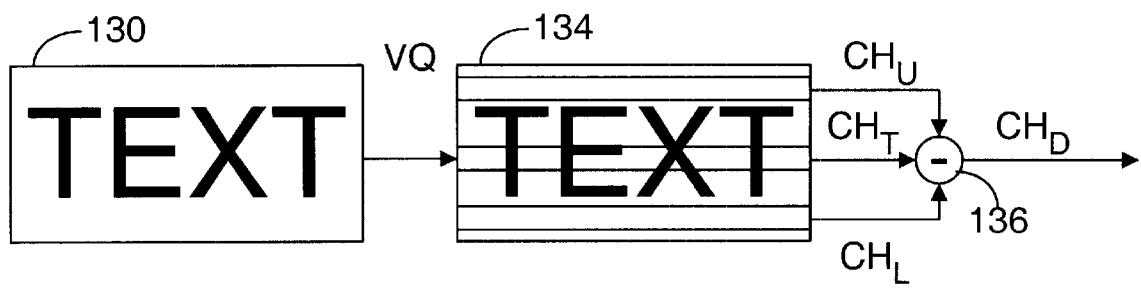
FIG. 8

GENERALIZED TEXT LOCALIZATION IN IMAGES

BACKGROUND OF THE INVENTION

1. Technical Field of the Invention

The present invention relates generally to localization and/or segmentation of text in images.

2. Background Art

Existing work on text recognition has focused primarily on optical recognition of characters (called optical character recognition (OCR)) in printed and handwritten documents in answer to the great demand and market for document readers for office automation systems. These systems have attained a high degree of maturity. Further text recognition work can be found in industrial applications, most of which focus on a very narrow application field. An example is the automatic recognition of car license plates.

Proposals have been made regarding text detection in and text extraction from complex images and video. However, as can be seen from reading their descriptions, they are each non-general in some aspect. Further, some do not involve removal of the localized text from its background.

Accordingly, a need for a generalized approach of text localization and segmentation remains.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

FIG. 5 illustrates vertical segmentation applied to a portion of the text of FIG. 3.

FIG. 6 illustrates horizontal segmentation applied to a portion of the text of FIG. 3.

FIG. 7 illustrates an image on a web site that includes text and a background.

FIG. 8 is partially block diagram, partially flow diagram representation of color estimation through quantization according to some embodiments of the invention.

DETAILED DESCRIPTION

1. Introduction

Various embodiments of the present invention involve localization and/or segmentation of text in images, wherein the images may be still or motion images, such as in video or Web pages. Web pages may include video or non-video images. The text is not required to be in a particular location in the image or have a particular color. Further, the background (also called non-text) may have a simple (e.g., monochrome) or complex background.

Efficient indexing and retrieval of digital video is an important aspect of multimedia databases, The text in videos is one powerful high-level index for retrieval. Detecting, extracting and recognizing text can build such an index. It enables a user to submit sophisticated queries such as a listing of all movies featuring John Wayne or produced by Steven Spielberg. Or it can be used to jump to news stories about a specific topic, since captions in newscasts often provide a condensation of the underlying news story. For example, one can search for the term "Financial News" to get the financial news of the day. The index can also be used to record the broadcast time and date of commercials, helping the people who check for their clients whether their commercials have been broadcast at the arranged time on the arranged television channel. Many other useful high-level applications are imaginable if text can be recognized automatically and reliably in digital video. Segmenting and recognizing text in the non-text parts of web pages is also an important issue. More and more web pages present text in images. Existing text segmentation and text recognition algorithms cannot extract the text. Thus, all existing search engines cannot index the content of image-rich web pages properly. Text segmentation and text recognition might also help in automatic conversion of web pages designed for large monitors to small LCD displays of appliances, since the textual content in images can be retrieved.

2. Overview

Figure 1:
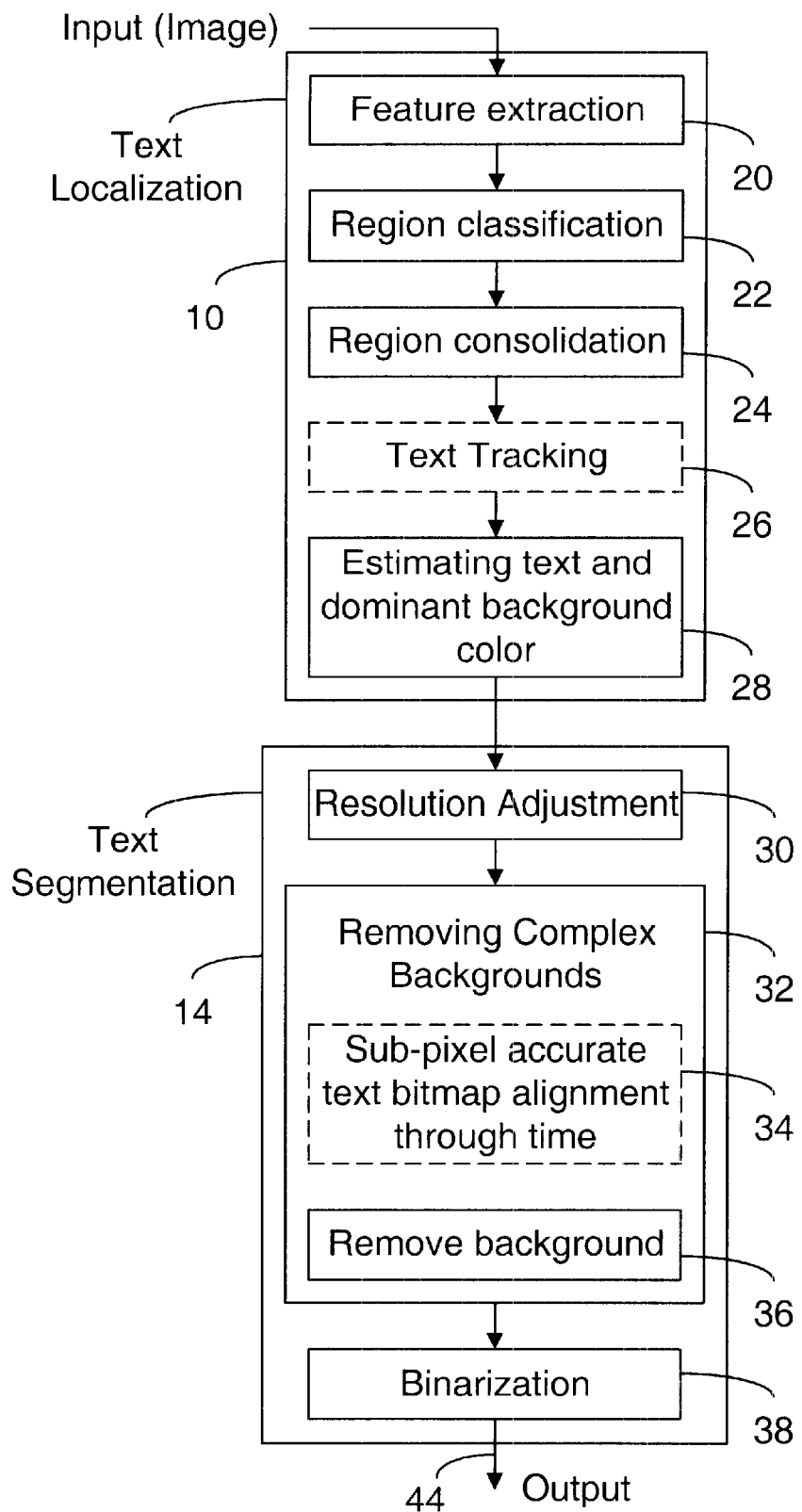
FIG. 1 is a flow diagram representing various functions performed in some embodiments of the invention.

FIG. 1 provides a flow diagram which is useful to give an over view relative to some embodiments of the invention. FIG. 1 includes a text localization block 10 and a text segmentation block 14. Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

2.1 Text Localization: A digital input signal (which typically includes an image) is received by feature extraction block 20 of text localization block 10. In some embodiments, any ASCII or related text (e.g., HTML text) is removed before or as the input signal is received by feature extraction block 20. Note that a Web page could have multiple images that are treated as separate images. The text localization block finds locations of text in images and marks them by tight text bounding boxes. In some embodiments, these bounding boxes should circumscribe only one text line of one text column. However, as described below, a text column is not limited to a single character. In some embodiments, localization includes the following:

(1) Feature extraction (block 20): A feature is extracted from the input image, which capture features unique to text.

(2) Region classification (block 22): Each pixel in the feature image is classified whether it belongs to text or not. Based on this information initial text bounding boxes are created.

(3) Region consolidation (block 24): The text bounding boxes are refined such that each contains only one line and column of text.

(4) Text Tracking (block 26): If the input is video, this block is added to the processing. Here we exploit the temporal redundancy of video to improve the precision of text bounding boxes as well as to remove many false alarms.

(5) Estimating text and dominant background color (block 28).

2.2 Text Segmentation; The text segmentation stage (block 14) removes the background (non-text pixels) and creates an output signal. The output signal on output 44 is an image text representation. An example of an image text representation is a text bitmap. The text bitmap may include, for example, a black text on a white background, regardless of the colors of the original text and background. The bitmap may be used by text recognition software to identify the particular text that has been localized and segmented by blocks 10 and 14. As an example, the text recognition software may be standard OCR software, which expects black text on a white background, although the invention is not limited to producing such an output signal.

To improve segmentation, each text box is scaled to a height of, for example, 100 pixels (block 30). Next, the background is removed (blocks 32 and 36). The search for background pixels starts on the border of the text bounding box. For video, this may be preceded by sub-pixel accurate alignment of the bitmaps of the same text (block 34). The remaining pixels may be binarized (block 38). As mentioned, the resulting binary bitmaps can be fed into standard OCR software to transcribe their content into, for example, ASCII.

The invention is not restricted to the particular blocks (10 and 14) of FIG. 1. In different embodiments, the details of these blocks (20–38) may be different and some blocks could be eliminated, consolidated, or have a different order.

3. Additional overview information and summary

Some embodiments of the text localization and segmentation system belong to a class of top-down approaches. Potential text lines are refined in case of video by exploiting its temporal redundancy (section 5). Like in the text localization, the text segmentation may also use the temporal redundancy of video to improve the segmentation result. Several basic decisions are involved in some embodiments. They include:

(1) Only horizontal text is considered since this is true for more than 99% of all artificial text occurrences. Experiences with older systems, which considered any writing direction, suggests that the missing 1% of text occurrences would be paid off by a much higher false alarm rate. As long as a performance of >90% correctly segmented text in videos and images is still a challenge, non-horizontal text can be neglected.

(2) Non-text regions are much more likely than text regions. Therefore, we decided to train the raw text detector as tight as possible (trained for a specific size of text at a specific position). Scale and position independence may be achieved by a applying our text detector at all positions in all scales.

Another decision is that text occurrences only matter if they consist of a least two letters or digits.

The invention is, however, not restricted to the particular details mentioned above. For a particular applications, it may be known that vertical text will be used, in which case, it can be accommodated. Further, if other information is known about the image, the particular embodiment of the invention may be modified to take advantage of that knowledge.

4. Text Localization

Figure 2:
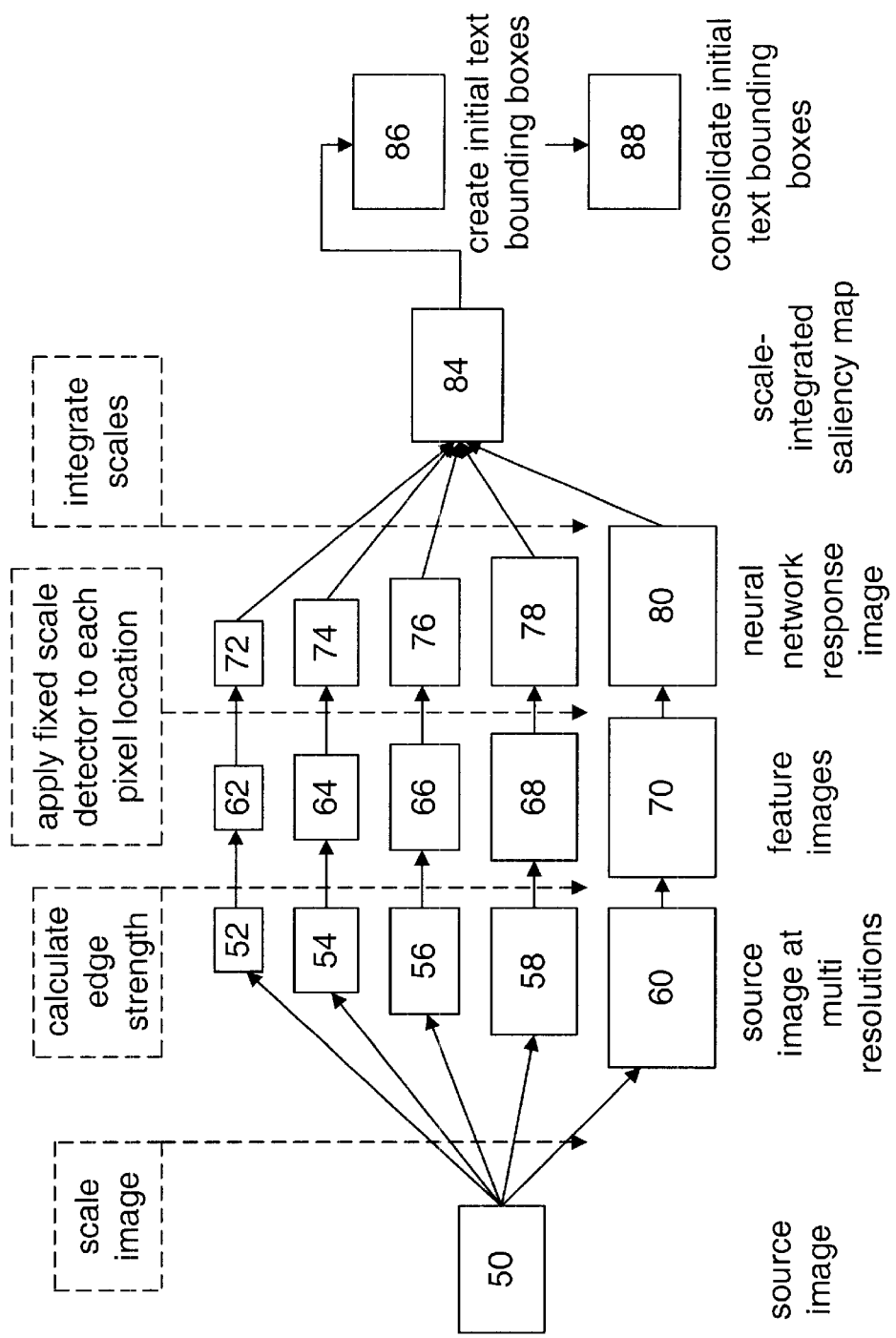
FIG. 2 is flow diagram representing images at various stages of localization in some embodiments of the invention.

Referring to FIG. 2, an image 50 is scaled into multiple image 52, 54, 56, 58, and 60 of different sizes. The images may be still images or image frames in video. Although five images are shown, the number may be more or less than five. The edge orientation of pixels in the image is determined to create feature images 62, 64, 66, 68 and 70 (see section 4.1). A fixed scale text adapter is applied to classify pixels in the edge orientation image to create images 72, 74, 76, 78, and 80 (see section 4.2). Images 72–80 are integrated into one saliency map 84 associated with an image (see section 4.3). Initial text bounding boxes are created from saliency map 84 (see section 4.4.1). The text bounding boxes and an associated image which is the same as or similar to image 50 are represented by block 86. The text bounding boxes of block 86 are revised (e.g., consolidated) (see section 4.4.2) to created revised text bounding boxes as represented by block 88 which also represents the image associated with block 86. Note that the text bounding boxes are not part of the image, but are associated with the image. 4.1 Image Features Artificial text occurrences have been commonly characterized in the research community as regions of high contrast and high frequencies. There are many different ways to amplify these features. One way is to use the gradient image of the RGB (red, green, blue) input image $I(x,y)=(I_r(x,y), I_g(x,y), I_b(x,y))$ in order to calculate the complex-values edge orientation image E. E is defined as follows: Let $A_c(r,\phi)$ be the angular coordinate representation of the Cartesian derivation image $\nabla I_c(x,y)$ of color plane c. Then, E is defined as the Cartesian coordinate representation of $A(r,\phi \mod 180°)$ $$A(r, \varphi \mod 180°) = \sum_{c \in \{r,g,b\}} A_c(r, \varphi \mod 180).$$

The modulo 180 degree is applied to convert direction into orientation. E serves as our feature for text localization.

Another way is to use the directional derivation $D^c_x$ and $D^c_y$ of image band b to calculate the directional edge strength $$E_x = \sum_{c \in \{r,g,b\}} |D^c_x| \text{ and } E_y = \sum_{c \in \{r,g,b\}} |D^c_y|.$$

as well as its overall edge strength $$E = 1/3 \sum_{c \in \{r,g,b\}} ((D^c_x)^2 + (D^c_y)^2)^{1/2}.$$

4.2 Fixed scale text detector

In some embodiments, a fixed scale text detector is used to classify each pixel in the edge orientation image E based on its local neighborhood whether it is part of a text region of certain size. For example, given a 20×10 pixel region in an edge orientation image E, the fixed scale text detector classifies whether the region contains text of a certain size. There are many different techniques for developing a classifier. Examples include a Bayes classifier, a mixed-gaussian classifier, and a neural feed-forward network (which has a good generalization capability). For our work, we compared the performance of a Bayes classifier using the Neyman-Pearson criterion with the performance of a real-valued and complex-valued neural feed-forward network. The complex-valued neural network with a hyperbolic tangent activation function may provide superior performance. In some experiments, at a comparable hit rate (90%), its false hits (0.07%) on the validation set was more than twice as low than with a comparable real-valued network.

Network Architecture. Various network architecture may be used. In some embodiments, 200 complex-valued neurons fed by a 20×10 edge orientation region in E serve as network input. This size of the receptive field exhibits a good trade-off between performance and computational complexity. An input layer of 30×15 neurons achieved not better classification results, but was computational more expensive. On the other side, using an input layer with less than 10 rows resulted in substantially worse results. Note that the number of rows of the receptive field determines the size of the font being detected since all training text patterns are scaled such that the fonts size is equal to the number of rows. The input layer in turn is connected to a hidden layer of 2 complex-valued neurons. Again, using more hidden neurons did not result in any performance improvements, while using only one increased the false alarm rate by a factor of three. The hidden layer is aggregated into one real-valued output neuron.

Network Training. There are various ways to accomplish network training. The following describes some ways, but the invention is not so limited. The training and validation test set should be as small as possible while still being representative. It should contain all typical text patterns and non-text patterns. Theoretical investigations have shown that neural networks will be most efficient, if the relation between the number of text and non text samples in the training set corresponds to the relation of the two groups in the application. A quantity of training samples which fulfill this criteria is obtained. While it is straightforward how to get examples for different types of text, it may be more difficult to get a representative non-text set.

A solution to this problem is the so-called "bootstrap" method. The composition of the training set may seriously affect a network's performance. In some embodiments, a representative set of 30180 text patterns and 140436 non-text patterns were collected. Initially 6000 text patterns and 5000 non-text pattern were selected randomly for training. Only the non-text pattern set was allowed to grow by another 3000 patterns collected by means of the "bootstrap" method. This method starts with an initial set of non-text patterns to train the neural network. Then, the trained network is evaluated using a validation set distinct from the training set (here: all patterns minus the training set). Some of the falsely classified patterns of the validation set are randomly added to the training set and a new, hopefully enhanced neural network is trained with this extended and improved training set. The resulting network is evaluated with the validation set again and further falsely classified non-text patterns are added to the training set. This cycle of training and directed adding new patterns is repeated until the number of falsely classified patterns in the validation set does not decrease anymore or—like in our case—3000 non-text patterns (and only non-text patterns)—have been added. This iterative training process guarantees a diverse training pattern set.

Given a properly trained neural network, a 20×10 pixel window slides over the edge orientation image E and is evaluated at each position. The network's response is stored in a so-called response image by filling the associated 20×10 region in the response image with the networks output value if and only if it exceeds $th_{network}=0$ (between −1 and 1). Since a step size of one may be computationally prohibitive for large images or high definition television (HDTV) video sequences, we use a step factor of 3 and 2 in the x and y direction, respectively. It may be that the subsampling does not causes any decrease in accuracy but a speed-up of 6x.

Under other embodiments, using a real valued network, logistic activation function, at each window location, the output of the neural network is tested if it exceeds $th_{network}=0.85$ (between 0 and 1.0). If so, a box of 20×10 filled by the neural network's output value may be added to the associated position in the response image.

4.3 Scale Integration.

In some embodiments, the raw fixed-scale text detection results at all scales (images 72–80) are integrated into one saliency map of text in order to recover initial text bounding boxes. (See, FIG. 2, block 82.) In many situations, text locations identify themselves as correct hits at multiple scales, while false alarms appear less consistent over multiple scales. A saliency map may be created by projection of the confidence of being text back to the original scale of the image. (An example of the confidence of being text is an activation level of the neural network output.) The saliency map may be initialized by zero. Then, for each detected bounding box at each scale its confidence value of being text is added to the saliency map over the size of the bounding box at the original image scale. There may be more than one bounding box in a given scale within the vicinity of a particular area. In some embodiments, the saliency map may reflect the total number of bounding boxes from all image scales within the vicinity of a particular area.

4.4 Extraction of Text Bounding Boxes 4.4.1 Initial Text Bounding Boxes

There are various ways to create text bounding boxes. The following describes techniques for some embodiments, but the invention is not restricted to these details. To create an initial set of text bounding boxes around regions of strong saliency, the algorithm starts to search for the next not yet processed pixel in the saliency map with a value larger then a pre-specified threshold $th_{core}$. The choice of the threshold's value is determined by the goal to avoid the creation of text boxes for non-text regions. Non-text regions should be less salient. For our classifier, $th_{core}=5.0$ worked fine, however, it may have to be adjusted (e.g., if a new neural network is trained). A number other than 5.0 could be used. Once a pixel, called core pixel, in the saliency map with value $P(x,y) > th_{core}$ is found, it is taken as a seed for a new text box of height and width 1. This new text box is then expanded iteratively. The following pseudo code (called Pseudocode Example 1) gives an example of the Initial text box creation algorithm.

Initial text box creation algorithm (Pseudocode Example 1);
  (1) search for next core pixel and create a new text box of width and height 1.
  (2) do
  (3) extendNorth(box)
  (4) extendeast(box)
  (5) extendSouth(box)
  (6) extendWest(box)
  (7) while (box changed)

The average intensity of the pixels of the adjacent row above the total width of the box in the overall edge strength image is taken as the criterion for growing in that direction. If the average intensity is larger than $th_{region}=4.5$, the row is added to the box. This value is chosen to be a little bit smaller than $th_{core}$ in order not only to get a text box including the core of a text region, but a text box that encompasses all parts of the text. Next, the same criterion is used to expand the box to the left, bottom, and right. This iterative box expansion repeats as long as the bounding box keeps growing (see Pseudocode Example 1).

Figure 3:
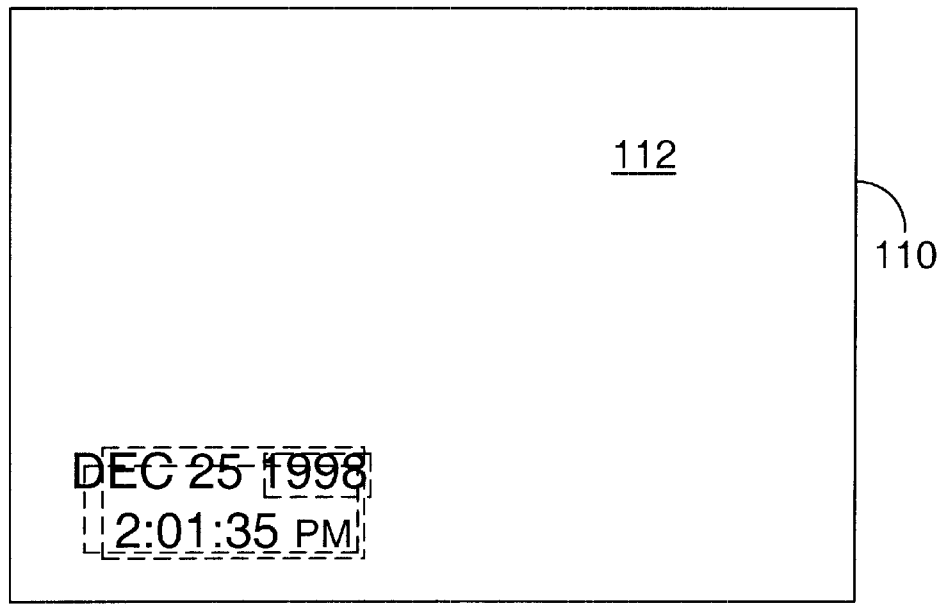
FIG. 3 illustrates examples of initial bounding boxes for an image in a frame having text and a background.

FIG. 3 illustrates date and time in an image in a video frame 110 and examples of initial bounding boxes, although the invention is not restricted to the particular examples. The background of frame 110 could be a solid color (such as white as illustrated) or a more complex background with different colors of various shapes. The text bounding boxes are illustrated as dashed lines. There could be additional text in image 110.

4.4.2 Revised Text Bounding Boxes

The initial bounding boxes often do not optimally frame the text in the image: In practice, some boxes contain no text (false alarms); others span more than one line and/or column of text, and in many the background make up a large portion of the pixels. Fortunately, these shortcomings can be overcome by an iterative post-processing procedure utilizing the information contained in so-called projection profiles.

A projection profile of an image region is a compact representation of the spatial pixel content distribution and has been successfully employed in document text segmentation. While histograms only capture the frequency distribution of some image feature such as the pixel intensity (all spatial information is lost), intensity projection profiles preserve the rough spatial distribution at the cost of an even higher aggregation of the pixel content. A horizontal/vertical projection profile may be defined as the vector of the sums of the pixel intensities over each column/row.

Figure 4:
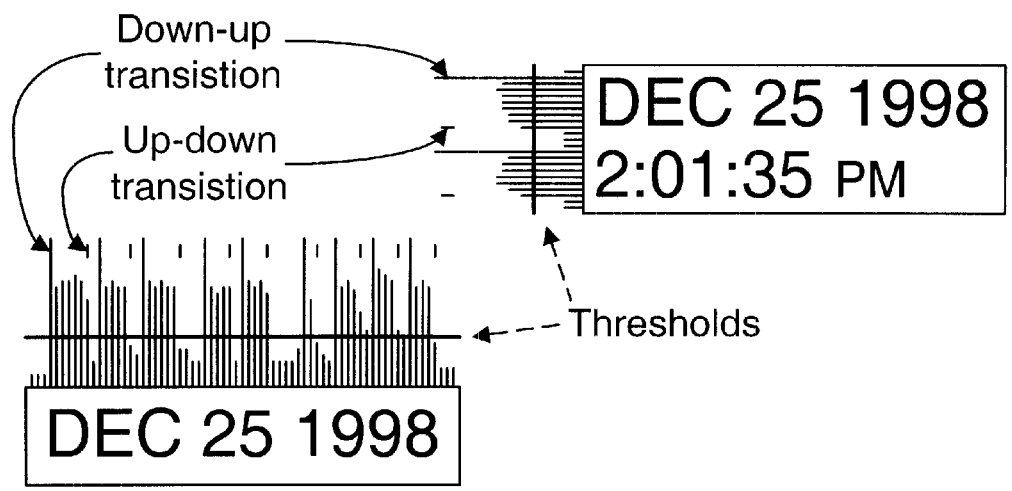
FIG. 4 illustrates examples of vertical and horizontal projection profiling.

FIG. 4 shows an example in which vertical and horizontal projection profiles are depicted as bar charts along the x and y axes of the feature images. The upper boundaries of the text lines are marked by steep rises in the vertical projection profile while the lower boundaries are marked by steep falls. Similarly, the right and left boundaries of text objects are indicated by steep rises and falls in the horizontal projection profile. These steep rises and falls can be identified as locations where the profile graph crosses an adaptively set threshold line. Down-up transitions are signified by a long line and up-down transitions are signified by a short line (as labeled in FIG. 4).

The term "text object" is used as follows. In the case of a single image, a text object is a text boundary box (including one that has been through the revision process). In the case of video, a text object includes multiple text bounding boxes (including those that have been through the revision process) from different frames in time. Stated differently, in the case of video, the text object includes different instances of the same text from different frames (images).

An example of a vertical segmentation algorithm is given in pseudocode form in Pseudocode Example 2. An example of a horizontal segmentation algorithm is given in pseudocode form in Pseudocode Example 3. However, the invention is not limited to the particular details shown in Pseudocode Examples 3 and 4. There are other ways to implement embodiments of the inventions. Note that the term "segmentation" is used in this section in connection with revising initial bounding boxes and in section 6 to refer generally to removing text from the background.

Vertical segmentation algorithm (Pseudocode Example 2):
 (1) expand box at the top and bottom by the minimum of half the height of the original text box and half the possible maximal text height
 (2) calculate vertical projection profile of the |E|
 (3) get minimum and maximum profile values
 (4) calculate the segmentation threshold
 (5) set change=false
 (6) for all rows of the profile
 (7) if (profile[current row]>threshold)
 (8) if (no upper boundary yet)
 (9) set upper boundary=current row
 (10) else
 (11) if (no lower boundary yet)
 (12) set lower boundary=current row
 (13) if (upper boundary)
 (14) create new box using the values of the upper and lower boundaries
 (15) unset current upper and lower boundaries
 (16) set change=true
 (17) delete processed box Horizontal segmentation algorithm (Pseudocode Example 3):
 (1) expand box at the left and right by the minimum of half the height of the original text box and half the possible maximal text height
 (2) calculate horizontal projection profile of the |E|
 (3) get minimum and maximum profile values
 (4) calculate the segmentation threshold
 (5) for all columns of the profile
 (6) if (profile[current column]>threshold)
 (7) if (no left boundary yet)
 (8) set left boundary=current column
 (9) else if (right boundary)
 (10) if (gap between current column and right boundary is large enough)
 (11) create new box from left and right boundaries
 (12) unset left and right boundaries
 (13) else
 (14) unset right boundary
 (15) else if (no right boundary)
 (16) set right boundary=current column
 (17) if (left && no right boundary)
 (18) right boundary=last column
 (19) if (left and right boundaries)
 (20) update processed box to current right/left boundaries
 (21) else
 (22) delete processed box With reference to Pseudocode Example 2, in some embodiments, the vertical segmentation algorithm applied to each text box works as follows, although the invention is not limited to these details. The box is enlarged at the top and bottom (lines (1) and (2) in Pseudocode Examples 2). The enlargement is desirable because the correct boundary may lie outside the current box and therefore the initial boundaries accidentally may cut off a portion of the text. To recover these boundaries correctly, some rows outside the original box should be taken into consideration. We set the top and bottom enlargements to the minimum of half the height of the original text box and half the possible maximal text height. While half the height of the original text box seems to be a good worst case estimate for imperfection in the initial vertical boundaries, the restriction to half the maximal possible text height is used because the original text box could contain more than one line of text and therefore half the height of the text box might be larger than the maximal possible text height.

Next, the vertical projection profile over the enlarged box of the feature image |E| is calculated as well as the maximum and minimum values $\max_{profile}$ and $\min_{profile}$ in the profile. To determine whether a single value in the projection profile belongs to a text line, a threshold $\text{thresh}_{text}$ may be calculated as $\text{thresh}_{text} = \min_{profile} + (\max_{profile} - \min_{profile}) \times 0.175$. (Note line (4) in Pseudocode Example 2). The factor of 0.175 was chosen experimentally and may be different in other embodiments. Every line with a vertical profile value exceeding $thresh_{text}$ is classified as containing text.

In lines (6)–(8) of Pseudocode Example 3, the algorithm begins to search for the first down-up transition starting from the top. This row is marked as a potential upper bound of a text box (line 9). Then, the next up-down transition is searched in the projection profile (line 13). If found a new box with the current upper and lower boundaries is created. The search for a new pair of down-up and up-down transitions continues until all elements in the projection profile have been processed. Finally, the original text box may be deleted. The text box is now split into its text line. See FIG. 5, which shows vertical segmentation applied to a portion of the frame of FIG. 3. Note that additional revisions should be performed to the bounding boxes shown in FIG. 5.

Analogously, the horizontal segmentation algorithm (Pseudocode Example 3) is applied to ensure that text in one line which does not belong together is separated. However, in some embodiments, two differences may exist between Pseudocode Examples 2 and 3:

(1) A factor of 0.25 instead of 0.175 is used in the computation of $thresh_{text}$. Experimentally, this value has proven to be superior for the horizontal segmentation.

(2) A gap parameter has been added. Unlike the vertical segmentation words in the "same" column should not be split up due to small gaps between the individual words. Therefore, the gap parameter is needed to bridge these low horizontal profile values if necessary. If the algorithm has found already a pair of down-up and up-down transitions and thus a pair of potential left and right boundaries and if the gap between the found up-down transition and the current column is large enough, the down-up transition found on the current column is interpreted as the left boundary of a new text object and a new box is created from the formerly found pair of transitions. The current column is marked as a new potential left boundary. If the gap is not large enough, the algorithm interprets the valley in the profile as being to small and consequently ignores (deletes the potential left boundary found so far). The algorithm continues with the next value in the profile. The invention is not limited to these details.

FIG. 6 gives an example of the result of the horizontal segmentation algorithm. Note that additional revisions should be performed to the bounding boxes for more complex layouts.

FIG. 7 illustrates text "DOW JONES Commodities trading is risking and is not for everyone" in an image 120 that includes a background 124. Image 120 is in a webpage 126. Background 124 may be a single color or a complex background (e.g., with many colors of different shapes). The vertical segmentation algorithm may not initially separate the different text lines of "Commodities trading involves risk and is not for everyone." The reason for this becomes clear if one imagines what the vertical projection profile for the respective text box looks like. The text box in the left column may mask the vertical profiles of the smaller text to the right which therefore could not be split into two text lines. On the other hand, the gap between these two text columns is large enough to be split up after the horizontal segmentation algorithm was applied. Experimentally it turns out, that almost every layout can be divided into its text rows and columns if a few cycles (or passes) of vertical and horizontal segmentations are applied to the text boxes.

Since the text height in images as well as in video frames is limited, in some embodiments, boxes with $height < min_{textheight} = 8pt$ or $height > max_{textheight} = image_{height}/2$ are classified as non-text regions and therefore discarded. Moreover, since horizontal segmentation assures that text boxes contain text objects like words or text lines, the height of correctly segmented text boxes should be smaller than their width. Consequently, boxes with height>width may be discarded, too. Finally, text boxes which have the same upper and lower boundary and are close enough to touch or overlap each other may be joined into one text box. This reduces complexity and may later enable a more stable text tracking throughout time.

4.4.3 Estimating Text Color and Background Color

In some embodiments, estimates of the text color and background color for each text bounding box are made. The estimates may be used to determine whether a text bounding box contains normal text (dark text on bright background) or inverse text (bright text on dark background). Images are typically colorful. Even a visually single-colored region like a character in a video frame consists of pixels of many different but similar colors. Accordingly, the complexity of the color distribution in each text bounding box may be reduced by quantizing the colors to, for example, the four most dominating colors. A variety of vector quantizers may be used. In our work, we used a fast vector quantizer, which are readily available.

A text color histogram provides a measure of the amount of the quantized colors included text in a bounding box. The measure may be of a sample of the text, for example, the four center rows of the text bounding box. The colors measured by the text color histogram would typically also include some background intermingled between letters and inside some letters (e.g., "o"). Of course, portions of the text other than the four center rows could be used for the text color histogram.

A background color histogram may provide a measure of the amount of the quantized colors included in portions of the background. For example, the portions could be two rows directly above and below the text box (four rows together). Note that this background color histogram can include components from two background color histograms (e.g., one from above the text and the other from below the text). Alternatively, there might be only a background color histogram from above the text or one color histogram from below the text.

In some embodiments, a difference histogram is calculated between the text and background histograms. The maximum color of the difference histogram is very likely to correspond to the text color and the minimum color of the difference histogram to the dominating background color. This methodology was proved experimentally to be very reliable for homogeneously colored text. Of course, it may fail for multi-colored text, which is rare.

Based on the estimated text color and the most dominant background color we estimate whether a text bounding box contains normal text or inverse text, described above. If the grayscale value of the text color is lower than dominant background, we assume normal text, otherwise inverse text.

FIG. 8 is a block diagram illustration of the use of vector quantization and the use of color histograms to estimate the color according to some embodiments of the invention. Other embodiments have different details. Referring to FIG. 8, block 130 represents a bounded text box and surrounding background before it is vector quantized (VQ). Block 134 represents the bounded vector quantized text signal and background. After VQ, the text signal including background has only four colors. A text color histogram $CH_T$ is created from, for example, a strip (e.g., four center rows) through the center of text. Upper and low color histograms $CH_U$ and $CH_L$ are created from a strip (e.g., two rows) above the text and from a strip (e.g., two rows) below the text, respectively. In the example, 4 colors are allowed. Therefore, the color histograms provide a representation of the amount of each of the colors C1, C2, C3, and C4 included in the strips after VQ. A difference color histogram $CH_D$ is created, where $CH_D = CH_T - CH_U - CH_L$. As suggested above, color histograms $CH_U$ and $CH_L$ may be summed before being subtracted from $CH_T$.

Note that the estimated color may be used as described in sections 6.2.2 and 6.3, below.

However, in section 5 to section 6.2.1 and the first part of section 6.2.2, images with gray scale colors (such as the image 88 in FIG. 2) may be used.

5. Exploiting Information Redundancy in Videos

Video is distinguished from still images and non-video web pages by temporal redundancy. Typically, each text line appears over several contiguous frames. This temporal redundancy can be exploited to:

(1) increase the chance of localizing text since the same text may appear under varying conditions from frame to frame, (2) remove false text alarms in individual frames since they are usually not stable throughout time, (3) interpolate the locations of "accidentally" missed text lines in individual frames, and (4) enhance text segmentation by bitmap integration over time.

However, exploiting this redundancy may be computational expensive, and applying our text localization scheme of section 4 may be prohibitive. To see this, suppose the image-based text localizer needs about 5 seconds per MPEG-I video frame. Processing a minute of video could add up to 2.5 hours! MPEG refers to Moving Picture Experts Group. Current and proposed MPEG formats include MPEG-1 ("Coding of Moving Pictures and Associated Audio for Digital Storage Media at up to about 1.5 MBits/s," ISO/IEC JTC 1 CD IS-11172 (1992)), MPEG-2 ("Generic Coding of Moving Pictures and Associated Audio," ISO/IEC JTC 1 CD 13818 (1994); and MPEG4 ("Very Low Bitrate Audio-Visual Coding" Status: call for Proposals 11.94, Working Draft in 11.96)., There are different versions of MPEG-1 and MPEG-2. Various formats other than MPEG may be used.

5 5.1 Text Objects

Figure 9:
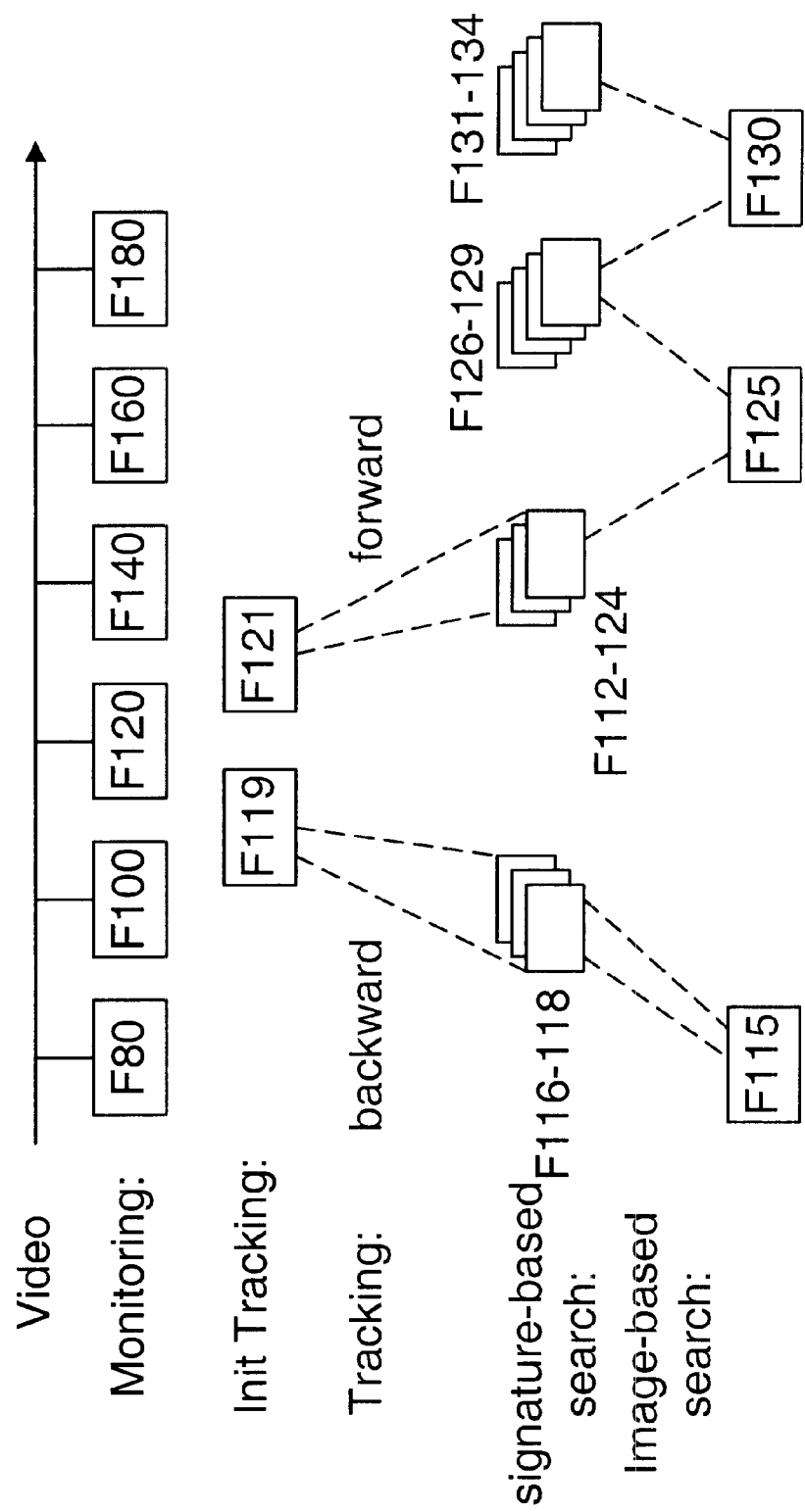
FIG. 9 is a flow diagram representing a relation between video monitoring and text tracking according to some embodiments of the invention.

In the case of still images, all localized text bounding boxes are generally independent and unrelated to each other. To exploit the redundancy inherent in video, text bounding boxes of the same content in contiguous frames may be summarized into one text object based on the visual contents of the text bounding boxes. In the case of video, a text object describes a text line over time by its image text representation (e.g., bitmaps), sizes and positions in the various frames as well as its temporal range of occurrence. Complete text objects in videos are extracted in a two-stage process in order to reduce computational complexity. The following describes operation in some embodiments, although the invention is not so limited. In a first stage, a video signal is monitored at a coarse temporal resolution (see FIG. 9). For instance, the image-based text localizer described in section 4, is only applied to every 20th frame (e.g., frames F80, F100, F120, etc. in FIG. 9). If text is detected (e.g., in frame F120), the second stage of text tracking will be entered. In this stage, text lines found in the monitor stage are tracked backwards (e.g., frame F119) and forwards (e.g., frame F121) in time up to their first (e.g., frame F115) and last frame of occurrence (e.g., frame F134). This stage uses a combination of signature-based search of text lines and image-based text localization. A signature-based search is less computationally intensive than image-based text localization (section 4). A signature-based search could include comparing edges or areas of the text with things in other frames. It could involve an edge map comparison. Horizontal profiles could be compared.

5.1.1 Video Monitoring For Text Occurrences

In some embodiments, video is monitored for text occurrences at a coarse temporal resolution. For this purpose, the image-based text localizer might be only applied to an evenly spaced frame subset of the video. The step size is determined by the objective not to oversee any text line. However, it may be unimportant whether text lines are localized at the beginning, at the middle or at the end of their temporal occurrence. In any case, the text tracking stage will recover the actual temporal range of each text line.

The maximal possible step size may be given by the minimal assumed temporal duration of text lines occurrences, which we assume to be one second. Vision research indicates that humans need between 2 and 3 seconds to process a complete scene. Thus, it seems reasonable to assume that text should appear clearly for at least ⅔ of a second in order to be easily readable. For a 30 fps video this translates to a step size of 20 frames.

In some embodiments, if the image-based text localizer does not find any text line in frame$_t$, the monitor process continues with frame$_{t+20}$. If, however, at least one text line is found, the image-based text localizer may be applied to frame$_{t-1}$ and frame$_{t+1}$. Next, for each text line in frame$_t$ the algorithm searches for a corresponding text line in frame$_{t-1}$ and frame$_{t+1}$. Correspondence between to text lines may be defined as an area overlap of at least 80% of their respective bounding boxes at their frame locations, although other values could be used. If A and B represents the point set describing the reference and the second bounding box, respectively, then the percentage of overlap may be defined as overlap=$|A \cap B|/|A|$. Consequently, in this case, two corresponding boxes cannot differ more than 20 percent in size if they occur at the same position in contiguous frames and/or are only allowed to be slightly shifted against each other if they have the same size. Small shifts are common for non-static text. If corresponding boxes in frame$_{t-1}$ and frame$_{t+1}$ are found for a text box in frame$_t$, a new text object (comprising these text boxes) is created and marked for tracking in time. Pseudocode Example 4 gives a summary of the video monitoring process.

Video monitoring algorithm for text occurrences (Pseudocode Example 4):

(1) video={frame 0, . . . , frame T}

(2) for t=0 to T step ⅔ seconds (3) localize text in frame t (4) if no text line found (5) continue with next t (6) localize text in frame t−1 and t+1

(7) for all text lines in frame t which do not belong to any text object yet (8) search for corresponding text line in t−1, t+1

(9) if search successful

(10) create new text object

(11) track textobject backward
(12) track text object forward

5.1.2 Text Tracking

In some embodiments, each text object is then extended to all frames containing the respective text line based on the information contained in the text objects created in the video monitoring stage. (This reduces the number of bits maps to be provided on conductors 44 in FIG. 1) Text tracking may be performed both backwards and forwards in time. However, we restrict our description to forward tracking only since backward tracking does not differ from forward tracking except in the direction you go through the video. The basic idea behind our fast text tracker is to take the text line in the current video frame, calculate a characteristic signature which allows to distinguish this text line from text lines with other contents and search for the image region of same dimension in the next video frame which best matches the reference signature.

The vertical and horizontal projection profile as defined in section 4.4.2 serve as a compact and characteristic reference signature, although other signatures could be used. The center of a signature may be defined as the center of the bounding text box of the associated text line. Similarity between two signature may be measured by signature intersection (e.g., by the sum of the minimum between respective elements in the signatures). In cases where signatures capture an object of interest as well as changing background, signature or histogram intersection may outperform L-norms. To find the precise position of a text line in the next frame, all signatures whose centers fall into a search window around the center of the reference signature, may be calculated and compared to the reference signature. If the best match exceeds a minimal required similarity, the text line may be declared to be found and added to the text object. If the best match does not exceed a minimal required similarity, a signature-based drop-out is declared. The size of the search radius depends on the maximal assumed velocity of text. In our experiments we assumed that text needs at least 2 seconds to move from left to right in the video. Given the frame size and the playback rate of the video this translates directly to the search radius in pixels. In principle, we could predict the location by the information contained in the text object so far to narrow down the search space, however, there may be no computational need for it.

Note this signature-based exhaustive search algorithm may resemble the block matching algorithm for motion prediction, except that the similarity measure is based on a signature derived from a feature image of the actual image.

It may happen that the signature-based text line search does not detect a text line fading out slowly since the search is based on the signature of the text line in the previous frame and not on one fixed and derived master/prototype signature. The changes from frame to frame might be too small to be detectable. Further, the signature-based text line search may fail to track some zooming in or zooming out text. To overcome these limitations, the signature-based search may be replaced every x-th frame by the image-based text localizer in order to re-calibrate locations and sizes of the text lines. Newly detected text boxes, however, may be discarded here.

Heuristically, every 5th frame turned out to be a good compromise between speed and reliability, but over intervals could be used. Again, in some embodiments, the bounding boxes of corresponding text lines may overlap by at least 80%.

Due to imperfection in the video signal such as high noise, limited bandwidth (e.g. colors run into each other), text occlusion, compression artifacts, etc. continuous recognition of text objects in the strict sense (e.g., in every frame) is often not possible or practical. Therefore, it may not be a good idea to terminate tracking if no corresponding text line can be found in the next frame. Rather, tracking should be terminated only if for a certain number of contiguous frames no corresponding text line can be found. For this, two thresholds $\max_{DropOut}^{Signature-based}$ and $\max_{DropOut}^{image-based}$ may be used. Whenever a text object cannot be extended to the next frame, the respective counter may be incremented by one. The respective counter is reset to zero whenever its related search method succeeds. The tracking process may be aborted, as soon as one of both counters exceeds its threshold $\max_{DropOut}^{Signature-based}$ or $\max_{DropOut}^{image-based}$. In our experiments, the threshold for the image-based text localizer was set to $\max_{DropOut}^{image-based} 3$, but other values could be used. This kind of drop outs may be caused by very noisy video frames or temporarily occluded text. The threshold for the signature-based search was set to $\max_{DropOut}^{Signature-based}=4$, e.g., the distance between two complete localized frames, but other values may be used. A value of 4 allows for tracking of text lines where signature-based search is very difficult such as for zooming in or zooming out text. Pseudocode Example 5, below gives a summary of the video monitoring process, according to some embodiments of the invention. However, other embodiments of the invention may be implemented with other details.

Forward text tracking algorithm of a given text object (Pseudocode Example 5):

(1) sigBased_DropOuts=0
(2) imageBased_DropOuts=0
(3) while not (beginning or end of video||sigBased_DropOuts>maxSigBased_DropOuts||imageBased_DropOuts>maxImageBased_DropOuts)
(4) get next frame t
(5) if (frame has to be localized)
(6) localize text in frame t
(7) search localized text box that matches to the box in the last frame of the text object
(8) if (search successful)
(9) add text box to the text object
(10) reset sigbased_DropOuts and reset imageBased_DropOuts
(11) else
(12) increment imageBased_DropOuts
(13) else
(14) calculate feature image for frame t
(15) estimate search area a for the text line
(16) create a window w with the dimension of the text box in frame t−1
(17) get signature s1 of the text box in t−1
(18) for (each possible position of w in a)
(19) calculate signature s2 for w
(20) calculate error between s2 and s1
(21) memorize minimal error
(22) if (minimal error<threshold)
(23) add text box to the text object
(24) reset sigBased_DropOuts
(25) else
(26) increment sigBased_DropOuts.

5.1.3 Postprocessing

To prepare a text object for text segmentation, it may be trimmed down to the part which has been detected with high confidence. Therefore, in some embodiments, each text object is temporally trimmed down to the first and last frame in which the image-based text localizer detected the text line. Next, the text object is discarded if, for example, (1) it occur less than a second or (2) it has a drop-out rate of more than 25%.

Other values could be used. The first condition results from our observation that text lines are usually visible for at least one second and shorter text lines are usually false alarms. The second condition removes the text objects resulting from unstable tracking with which subsequent processing cannot deal. Unstable tracking may be caused by strong compression artifacts or non-text.

Finally, in some embodiments, one or more of the following global features may be determined for each text object. The particular details may vary in different embodiments.

(1) Text color of text object. Assuming that the text color of the same text line does not change over the course of time, the text color of a text object is determined as the median of all determined text colors per frame (e.g., as obtained through section 4.4.3). The text color does not have to be chosen to be the median. Another average or non-average measure could be used.

(2) Text size. The size of the text bounding box may be fixed or change over time. If it is fixed, we determine its width and height by means of the median over the set of widths and heights.

(3) Text position. The text line might be static in one or both coordinates. A text line is regarded as static in the x and/or y direction if the average movement per frame is less than 0.75 pixels. The average movement is calculated based on the difference in location between the first and last text occurrence of that text line normalized by the number of frames.

If the text line is static, we replace all text bounding boxes by the median text bounding box. The median text bounding box is the box which left/right/top/bottom border is the median over all left/right/top/bottom borders. If the position is only fixed in one direction such as the x or y axes, the left and right or the top and bottom are replaced by the median value, respectively.

6. Text Segmentation

The text segmentation involves removing backgrounds from text. This is not to be confused with the segmentation of section 4.4.2.

6.1 Resolution Adjustments. (Note block 30 In FIG. 1.)

Text segmentation acts may be performed on rescaled images (by, e.g., cubic interpolation) such that the text height of the text object under consideration has a fixed height of, for example, 100 pixel and the aspect ratio is preserved. The reasons for re-scaling are two-fold:

(1) Resolution enhancements of small font sizes which in turn leads to better segmentation results.

One of the major problems with current text extraction and text recognition in videos is its very low resolution. For MPEG-I encoded videos, individual characters often have a height of less than 12 pixels. Although text is still recognizable for humans at this resolution, it gives today's standard OCR systems a hard time. These OCR systems have been designed to recognize text in documents, which were scanned at a resolution of at least 200 dpi to 300 dpi resulting in a minimal text height of at least 40 pixels. In order to obtain good results with standard OCR systems it is desirable to enhance the resolution of the text lines.

Enhancing the visible quality of text bitmaps is another and even more important reason for up-scaling small text bitmaps. The higher resolution enables sub-pixel precise text alignment (with respect to the original resolution) in section 6.2.2.

(2) Computational savings for large font sizes.

A text height larger than the fixed height (e.g., 100 pixels) does not improve segmentation nor OCR performance. Reducing its size lowers the computational complexity significantly. Note that since our approach is truly multi-resolution and operates on web pages and HDTV video sequences with a resolution up to 1920 by 1280 pixels, larger font sizes are very likely. 100 pixels is only $\frac{1}{12}$ of the frame's height.

6.2 Removing backgrounds (including complex backgrounds)

As discussed, backgrounds may be removed. (Note block 32 in FIG. 1.) A complex background has larger variation than a simple background. However, the invention is not limited a particular type of background (it may be complex or simple background). However, as noted above, if particular information is known about the background of the image, an embodiment of the invention might be modified to use that information.

6.2.1 Images

Text occurrences are supposed to contrast with their background in order to be easily readable. This feature is used here to remove large parts of the complex background. In some embodiments, it works as follows, although the invention is not so limited. The basic idea is to increase the text bounding box such that no text pixels fall on the border and then to take each pixel on the boundary of the text bounding box as the seed to fill all pixels which do not differ more than $\text{threshold}_{seedfill}$ with the background color. (Note that in some embodiments, the change of the filled pixels to the background color is firstly only memorized and not actually executed on the bitmap. Execution may be performed after the seed-fills have been applied to all pixels on the box boundary.) The background color is black for inverse text and white for normal text. Since the pixels on the boundary do not belong to the text and since the text contrasts with its background, the seed-fill algorithm will never remove any character pixels. (Seed-fill algorithms are known in the art.) We call this newly constructed bitmap $B^r(x,y)$.

In our experiments, the Euclidean distance between RGB colors was used as the distance function, and the seed fill algorithm used a 4-neighborhood. Moreover, to ensure that all letters are completely contained in the text bounding box, we extended it horizontally by 20% and vertically by 40%. Other values could be used.

Not all background pixels need to be deleted, since the sizes of the regions filled by the seed-fill algorithm may be limited by the maximal allowed color difference between a pixel and its border pixel. The size of the remaining color regions can be used to fill the remaining regions of the background with the background color. In some embodiments, each pixel may be as a seed for the seed-fill algorithm. The 8-neighborhood seed-fill algorithm may then be applied hypothetically to $B^r(x,y)$ in order to determine the dimension of the region that could be filled. Background regions should be smaller then text character regions. Therefore, all regions with a height less than $\min_{height}$ pixels and a width less than $\min_{width}$ or larger than $\max_{width}$ are deleted, (set to the background color).

6.2.2 Video Images

A video text object differs from a single image text object in the respect that it includes multiple image text representations (e.g., bitmaps) of the same text line and not just one. In some embodiments, the following method is applied to exploit this redundancy to remove the complex background surrounding the actual characters. However, the invention is not limited to these details. The method can be applied to not only static text, but also to moving text because we have solved the problem of sub-pixel accurate text line alignment.

The original image may be reloaded in a gray scale format. However, the vector quantized version is used to determine which gray scale color is the same as the estimated text color as described below.

In some embodiments, it works as follows. Assume you pile up the various bitmaps of one text object such that the characters are aligned perfectly to each other. Pixels belonging to text tend to vary only slightly through time, while pixels belonging to non-text (background) often change tremendously through time. Since the text's location is static due to the alignment its pixels are not supposed to change. (Note that even though text is supposed to be static, there may be tiny changes from frame to frame.) Background pixels are very likely to change due to motion in the background or motion of the text line.

We derive a representative text line bitmap for each text object. Given the pile of perfectly-aligned bitmaps, the maximum/minimum operator is applied through time on the grayscale images for normal/inverse text. Note it is not necessary to use every bitmap of a text object, because the background usually does not change significantly between two consecutive frames. It turned out, that a selection of about 40 temporally evenly spaced frames can be enough to get very good results. For example, if 40 frames are selected and there are 200 frames, then the 40 frame could be spaced by 5. If there are 150 frames, the 40 frames could be spaced by 15/4, which means the spacing could round up or down to an integer or the spacing could be in consistent, some times 3, but mostly 4 to make 15/4 on average. Note also, some frames at the beginning and end of a text object may be skipped to avoid potential problems with fade in or fade out effects. As suggested above, image based localization techniques are used every so many frames to avoid having characteristic text color be changed slowly in fade in or fade out. Signature only tracking could result in the segmentation being ruined under such cases.

The following describes how to align the bitmaps essentially perfectly. At first, likewise for images and web pages all bounding text boxes of a text object may be extended, for example, horizontally by 20% and vertically by 40%. Next, all bitmaps may be converted to grayscale since grayscale is more stable to color compression artifacts. Almost all video compression algorithms represent intensity at a higher resolution than colors such as in the famous 4:2:0 sampling scheme.

Let $B_0(x,y), \ldots B_{N-1}(x,y)$ denote the N bitmaps under consideration and $B^r(x,y)$ the representative bitmap which is to be derived and which is initialized to $B^r_0(x,y)=B_0(x,y)$. As an example, N could be 40 so there are 40 bitmaps from 40 frames. Then, for each bitmap $B_i(x,y)$, $i \in \{1, \ldots, 39\}$, we may search for the best displacement (dx, dy) which minimizes the difference between $B^r(x,y)$ and $B_i(x,y)$ with respect to the text colors, e.g., $$(dx_i^{opt}, dy_i^{opt}) = \arg\min \sqrt{\sum_{(x,y) \in B^r \wedge B^r_{i-1}(x,y) \subseteq \text{textColor}} (B^r_{i-1}(x,y) - B_i(x+dx, y+dy))}.$$

The reason why this kind of block matching search works is because only pixels with text color are taken into account, where the text color may be the estimated text color from section 4.4.3. A pixel is defined to have text color if and only if it does not differ more than a certain amount from the text color determined for the text object. Note, that this distance is calculated based on the RGB values. At each iteration, $B^r(x,y)$ is updated from the previously stated equation to $$B^r_i(x,y) = \max(B^r_{i-1}(x,y), B_i(x+dx_i^{opt}, y+dy_i^{opt})) \text{ for normal text}$$

and to $$B^r_i(x,y) = \min(B^r_{i-1}(x,y), B_i(x+dx_i^{opt}, y+dy_i^{opt})) \text{ for inverse text}.$$

Note that if a text object has been identified to be static in section 4.4.3, we do not have to search for the perfect translations. Instead, the translations between the various bitmaps may be all set to null.

Through the process of section 6.2.2, the background may tend to get brighter and brighter for normal text and darker and darker for inverse text. However, it is possible that the first frame is the brightest or darkest, respectively.

6.3 Binarization (Note block 38 in FIG. 1.)

The text bitmaps $B^r_i(x,y)$ is now prepared for recognition by standard OCR engines. Hereto, the grayscale text bitmaps may be converted to black on white background. The following describes a way to find a suitable threshold value, one that allows good if not optimal separation between text and background. From section 4.4.3 we know the estimated text color, the dominant background color and whether we have to deal with normal text or inverse text. Since most of the background has been removed anyway in section 6.2, we decided to set the background color to black for inverse text and to white for normal text. Then, a good binarization threshold is to choose the intensity half way between the intensity of the text color and the background color. Each pixel in the text bitmap which is higher than the binarization threshold may be set to white for normal text and black for inverse text. Each pixel in the text bitmap which is lower or equal than the binarization threshold may be set to black for normal text and white for inverse text. Finally, it is recommended to clean-up the binary bitmap by discarding small regions (set to the background color) in the same way as described in section 6.2.1. Additional Information For each of the sections above, the invention is not limited to the particular details mentioned therein.

Some embodiments of the present invention are not only able to locate and segment text occurrences into large binary images, but also to label each pixel within an image or video whether it belongs to text or not. Thus, our text localization and segmentation techniques can be used for object-based video encoding. Object-based video encoding is known to achieve a much better video quality at a fixed bit rate compared to existing compression technologies. However, in most cases, the problem of extracting objects automatically is not solved yet. Our text localization and text segmentation algorithms solve this problem for text occurrences in videos.

Some embodiments of the invention involve a multi-resolution approach in which the text localization and text segmentation algorithm works successfully from MPEG-1 video sequences up to HDTV MPEG-2 video sequences (1980×1280) without any parameter adjustment. As an example, character sizes can vary between 8 pixels and half the frame height.

Figure 10:
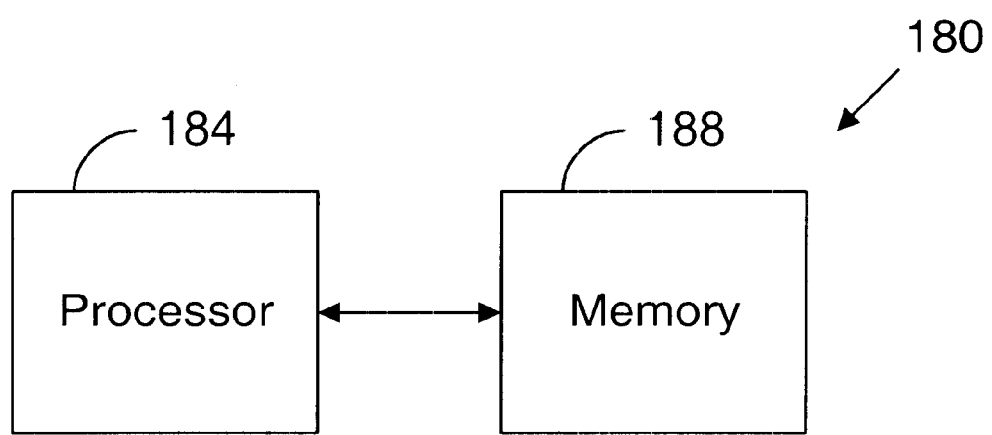
FIG. 10 is a block diagram representation of a computer system that can perform functions according to some embodiments of the invention.

FIG. 10 illustrates a computer system 180 having a processor 184 and memory 188. Memory 188 represents one or more of a variety of types of memory apparatus including RAM, hard drives, CD ROMS, and video memory to name only a few. Memory 188 includes machine readable mediums on which instructions can be stored to perform the various functions described above. Memory 188 can also store data (e.g., digital video signals) to be processed and intermediate and final results of processing. It will be appreciated that FIG. 10 is highly schematic and in practice would include a variety of other well known components.

The term frame is intended to have a broad meaning. For example, it does not matter whether it is interleaved or not. Likewise, the terms image and video are intended to be interpreted broadly. No particular format is required.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. A method of locating text in digital images, comprising:
    scaling a digital image into images of multiple resolutions;
    classifying whether pixels in the multiple resolutions are part of a text region;
    integrating scales to create a scale integration saliency map;
    using the saliency map to create initial text bounding boxes through expanding the boxes from rectangles of pixels including at least one pixel to include groups of at least one pixel adjacent to the rectangles, wherein the groups have a particular relationship to a first threshold; and
    consolidating the initial text bounding boxes.

2. The method of claim 1, wherein the particular relationship is that an average intensity of the group exceeds the first threshold.

3. The method of claim 1, wherein the groups include a row or column adjacent to the rectangle and the rectangle starts as a 1 pixel by 1 pixel rectangle.

4. The method of claim 1, wherein the saliency map is of the same resolution as the digital image before scaling to multiple resolutions.

5. The method of claim 1, wherein the digital image is part of a digital video image and consolidating of the initial text bounding boxes includes creating horizontal projection profiles having adaptive thresholds and vertical projection profiles having adaptive thresholds.

6. The method of claim 5, wherein the adaptive thresholds for the horizontal projection profiles are functions of minimum and maximum values of the horizontal projection profiles and the adaptive thresholds for the vertical projection profiles are functions of minimum and maximum values of the vertical projection profiles.

7. The method of claim 1, wherein consolidating the initial text bounding boxes includes repeatedly performing a horizontal segmentation algorithm and a vertical segmentation algorithm.

8. The method of claim 6, wherein the horizontal segmentation algorithm includes expanding a text bounding box at the top and bottom by a minimum of half the height of the original text box and half the possible maximal text height.

9. The method of claim 1, further comprising calculating edge orientation to identify image features in the multiple resolutions.

10. The method of claim 1, further comprising using a signature based tracking to identify frames including text in a text object in a forward and backward direction from a frame in which the text has been identified through an image based method.

11. The method of claim 1, further comprising estimating color of text in the image through creating color histograms in the text and non-text portions surrounding the text.

12. An apparatus comprising:
    a machine readable medium having instructions thereon which when executed cause a processor to perform a method including:
    scaling a digital image into images of multiple resolutions;
    classifying whether pixels in the multiple resolutions are part of a text region;
    integrating scales to create a scale integration saliency map;
    using the saliency map to create initial text bounding boxes through expanding the boxes from rectangles of pixels including at least one pixel to include groups of at least one pixel adjacent to the rectangles, wherein the groups have a particular relationship to a first threshold; and
    consolidating the initial text bounding boxes.

13. The apparatus of claim 12, wherein the particular relationship is that an average intensity of the group exceeds the first threshold.

14. The apparatus of claim 12, wherein the groups include a row or column adjacent to the rectangle and the rectangle starts as a 1 pixel by 1 pixel rectangle.

15. The apparatus of claim 12, wherein the saliency map is of the same resolution as the digital image before scaling to multiple resolutions.

16. The apparatus of claim 12, wherein the digital image is part of a digital video image and consolidating of the initial text bounding boxes includes creating horizontal projection profiles having adaptive thresholds and vertical projection profiles having adaptive thresholds.

17. The apparatus of claim 16, wherein the adaptive thresholds for the horizontal projection profiles are functions of minimum and maximum values of the horizontal projection profiles and the adaptive thresholds for the vertical projection profiles are functions of minimum and maximum values of the vertical projection profiles.

18. The apparatus of claim 12, wherein consolidating the initial text bounding boxes includes repeatedly performing a horizontal segmentation algorithm and a vertical segmentation algorithm.

19. The apparatus of claim 18, wherein the horizontal segmentation algorithm includes expanding a text bounding box at the top and bottom by a minimum of half the height of the original text box and half the possible maximal text height.

20. The apparatus of claim 12, further comprising calculating edge orientation to identify image features in the multiple resolutions.

21. The apparatus of claim 12, further comprising using a signature based tracking to identify frames including text in a text object in a forward and backward direction from a frame in which the text has been identified through an image based method.

22. The apparatus of claim 1, further comprising estimating color of text in the image through creating color histograms in the text and non-text portions surrounding the text.

23. A method, comprising:
classifying whether pixels are part of a text region;
creating initial text bounding boxes; and
consolidating the initial text bounding boxes, wherein the consolidating includes creating horizontal projection profiles having adaptive thresholds and vertical projection profiles having adaptive thresholds.

24. The method of claim 23, wherein the adaptive thresholds for the horizontal projection profiles is a function of minimum and maximum values of the horizontal projection profiles and the adaptive thresholds for the vertical projection profiles are functions of minimum and maximum values of the vertical projection profiles.

25. The method of claim 23, wherein consolidating the initial text bounding boxes includes repeatedly performing a horizontal segmentation algorithm and a vertical segmentation algorithm.

26. The method of claim 23, wherein the horizontal segmentation algorithm includes expanding a text bounding box at the right and left by a minimum of half the height of the original text box and half the possible maximal text height.

27. The method of claim 23, wherein the vertical segmentation algorithm includes expanding a text bounding box at the top and bottom by a minimum of half the height of the original text box and half the possible maximal text height.

28. An apparatus comprising:
a machine readable medium having instructions thereon which when executed cause a processor to perform a method including:
classifying whether pixels are part of a text region;
creating initial text bounding boxes; and
consolidating the initial text bounding boxes, wherein the consolidating includes creating horizontal projection profiles having adaptive thresholds and vertical projection profiles having adaptive thresholds.

29. The apparatus of claim 28, wherein the adaptive thresholds for the horizontal projection profiles is a function of minimum and maximum values of the horizontal projection profiles and the adaptive thresholds for the vertical projection profiles are functions of minimum and maximum values of the vertical projection profiles.

30. The apparatus of claim 28, wherein consolidating the initial text bounding boxes includes repeatedly performing a horizontal segmentation algorithm and a vertical segmentation algorithm.

31. The apparatus of claim 28, wherein the horizontal segmentation algorithm includes expanding a text bounding box at the right and left by a minimum of half the height of the original text box and half the possible maximal text height.

32. The apparatus of claim 28, wherein the vertical segmentation algorithm includes expanding a text bounding box at the top and bottom by a minimum of half the height of the original text box and half the possible maximal text height.

* * * * *